(12) United States Patent
Nagashima

(10) Patent No.: US 8,755,020 B2
(45) Date of Patent: Jun. 17, 2014

(54) LIQUID CRYSTAL DISPLAY DEVICE

(75) Inventor: Osamu Nagashima, Mobara (JP)

(73) Assignee: Japan Display Inc., Tokyo (JP)

( * ) Notice: Subject to any disclaimer, the term of this patent is extended or adjusted under 35 U.S.C. 154(b) by 136 days.

(21) Appl. No.: 13/556,259

(22) Filed: Jul. 24, 2012

(65) Prior Publication Data

US 2013/0027647 A1    Jan. 31, 2013

(30) Foreign Application Priority Data

Jul. 28, 2011    (JP) .................................. 2011-165234

(51) Int. Cl.
*G02F 1/1339*    (2006.01)

(52) U.S. Cl.
USPC .......................................... 349/156; 349/144

(58) Field of Classification Search
USPC .......................................... 349/144, 155, 156
See application file for complete search history.

(56) References Cited

U.S. PATENT DOCUMENTS

| | | | | |
|---|---|---|---|---|
| 7,286,204 | B2 * | 10/2007 | Yang et al. | 349/155 |
| 2006/0103803 | A1 * | 5/2006 | Jeon et al. | 349/155 |
| 2007/0097312 | A1 | 5/2007 | Park et al. | |
| 2012/0105789 | A1 * | 5/2012 | Lin et al. | 349/155 |

FOREIGN PATENT DOCUMENTS

| | | |
|---|---|---|
| JP | 2007-122061 | 5/2007 |
| WO | WO 2005/038518 A1 | 4/2005 |

* cited by examiner

*Primary Examiner* — Edward Glick
*Assistant Examiner* — David Chung
(74) *Attorney, Agent, or Firm* — Antonelli, Terry, Stout & Kraus, LLP

(57) ABSTRACT

A region of the first substrate and the second substrate enclosed by a sealant is a rectangle. The rectangle includes a central region, a pair of first regions between which the central region is interposed in a major-axis direction of the rectangle, a pair of second regions between which the central region is interposed in a minor-axis direction of the rectangle, and a peripheral region that surrounds the central region, the pair of first regions, and the pair of second regions. The spacers are disposed in the central region and the peripheral region except the pair of first regions and the pair of second regions. In the peripheral region, a width from each of the first regions to one long side of the rectangle in an outward direction is larger than a width from one of the second regions to the one long side in the outward direction.

13 Claims, 3 Drawing Sheets

LIQUID CRYSTAL DISPLAY DEVICE

CROSS-REFERENCE TO RELATED APPLICATION

The present application claims priority from Japanese application JP2011-165234 filed on Jul. 28, 2011, the content of which is hereby incorporated by reference into this application.

BACKGROUND OF THE INVENTION

1. Field of the Invention

The present invention relates to a liquid crystal display device.

2. Description of the Related Art

Since a liquid crystal panel has a pair of substrates, in order to maintain a gap (a space for sealing liquid crystal) between them, spacers are provided on one of the substrates (JP2007-122061A and international publication WO2005/038518). Alignment films are formed on the surfaces of respective substrates opposed to each other, and thus the alignment film on the spacers and the alignment film on the substrate may come in contact with each other. If the alignment films are exfoliated due to the contact, the exfoliated chips of the alignment films float in the liquid crystal, and thus light emitted from the backlight is reflected by them, and the chips become microscopic bright spots.

When a heat shock test (−35 to 85° C.; 90 to 360 cycles) was performed on a large-size liquid crystal panel, it was detected that microscopic bright spots occurred. In the large-size liquid crystal panel, due to the panel size, the amounts of bending of the substrate at high temperature and low temperature are large. Hence, the amount of lateral deviation between one substrate (thin film transistor substrate) and the other substrate (color filter substrate) is large. As the mechanism of occurrence of the microscopic bright spots, it can be inferred that the alignment films may be scraped against each other due to abrasion caused by the lateral deviation. Further, there is also a problem in that the alignment film appropriate for an increase in contrast tends to be scraped.

SUMMARY OF THE INVENTION

It is an object of the invention to reduce the rate of occurrence of the microscopic bright spots due to exfoliation of the alignment films.

According to a first aspect of the invention, a liquid crystal display device includes: a first substrate; a second substrate that is disposed to be opposed to the first substrate with a space interposed therebetween; a first alignment film that is formed on the first substrate; a second alignment film that is formed on the second substrate; spacers that are formed in at least one of a gap between the first substrate and the first alignment film and a gap between the second substrate and the second alignment film so as to thereby maintain a gap between the first substrate and the second substrate; a liquid crystal layer that is sandwiched between the first alignment film and the second alignment film; and a sealant that encloses and seals the liquid crystal layer and fixes the first substrate and the second substrate. In the device, a region of the first substrate and the second substrate enclosed by the sealant is a rectangle. The rectangle includes a central region, a pair of first regions between which the central region is interposed in a major-axis direction of the rectangle, a pair of second regions between which the central region is interposed in a minor-axis direction of the rectangle, and a peripheral region that surrounds the central region, the pair of first regions, and the pair of second regions. The spacers are disposed in the central region and the peripheral region except the pair of first regions and the pair of second regions. In the peripheral region, a width from each of the first regions to one long side of the rectangle in an outward direction is larger than a width from one of the second regions to the one long side in the outward direction. According to the aspect of the invention, the spacers are not disposed in regions in which it is detected through a simulation that the amount of deviation between the first substrate and the second substrate is large. Thereby, it is possible to reduce the rate of occurrence of the microscopic bright spots due to exfoliation of the alignment films. Further, in the peripheral region in which the spacers are disposed, the area thereof adjacent to the first region is larger than the area thereof adjacent to the second region. Hence, by securing a large area for arrangement of the spacers, it is possible to reduce a variation in gap.

According to a second aspect of the invention, in the liquid crystal display device according to the first aspect, the pair of first regions and the pair of second regions may be regions successively surrounding the central region.

According to a third aspect of the invention, in the liquid crystal display device according to the first aspect, a region, in which the spacers are disposed, may be interposed between one of the first regions and one of the second regions adjacent to each other.

According to a fourth aspect of the invention, the liquid crystal display device according to any one of the first to third aspects further includes stoppers that are formed in at least one of the gap between the first substrate and the first alignment film and the gap between the second substrate and the second alignment film and have a height less than that of the spacers. The stoppers may be disposed in the pair of first regions and the pair of second regions.

According to a fifth aspect of the invention, in the liquid crystal display device according to the fourth aspect, the spacers and the stoppers may be mixed in the central region and the peripheral region.

According to a sixth aspect of the invention, in the liquid crystal display device according to the fourth or fifth aspect, the spacers may be provided on only one of the first substrate and the second substrate, and the stoppers may be provided on only the first substrate or the second substrate on which the spacers are provided.

According to a seventh aspect of the invention, in the liquid crystal display device according to any one of the first to sixth aspects, the first substrate may be a color filter substrate, the second substrate may be a thin film transistor substrate, and the spacers may be provided on only the first substrate.

According to an eighth aspect of the invention, in the liquid crystal display device according to any one of the first to seventh aspects, the width of each of the first regions in the major-axis direction may be a quarter of a length of the major axis.

According to a ninth aspect of the invention, in the liquid crystal display device according to any one of the first to eighth aspects, the width of each of the first regions in the minor-axis direction may be two thirds of a length of the minor axis.

According to a tenth aspect of the invention, in the liquid crystal display device according to any one of the first to ninth aspects, a central point of each of the first regions in the major-axis direction may be at a position separated from a central point of the rectangle by one third of a length of the major axis in the major-axis direction.

According to an eleventh aspect of the invention, in the liquid crystal display device according to any one of the first to tenth aspects, the width of each of the second regions in the major-axis direction may be half of a length of the major axis.

According to a twelfth aspect of the invention, in the liquid crystal display device according to any one of the first to eleventh aspects, the width of each of the second regions in the minor-axis direction may be one eighth of a length of the minor axis.

According to a thirteenth aspect of the invention, the liquid crystal display device according to any one of the first to twelfth aspects, a central point of each of the second regions in the minor-axis direction may be at a position separated from a central point of the rectangle by one third of a length of the minor axis in the minor-axis direction.

DETAILED DESCRIPTION OF THE INVENTION

Hereinafter, embodiments of the invention will be described with reference to the accompanying drawings.

[First Embodiment]

Figure 1:
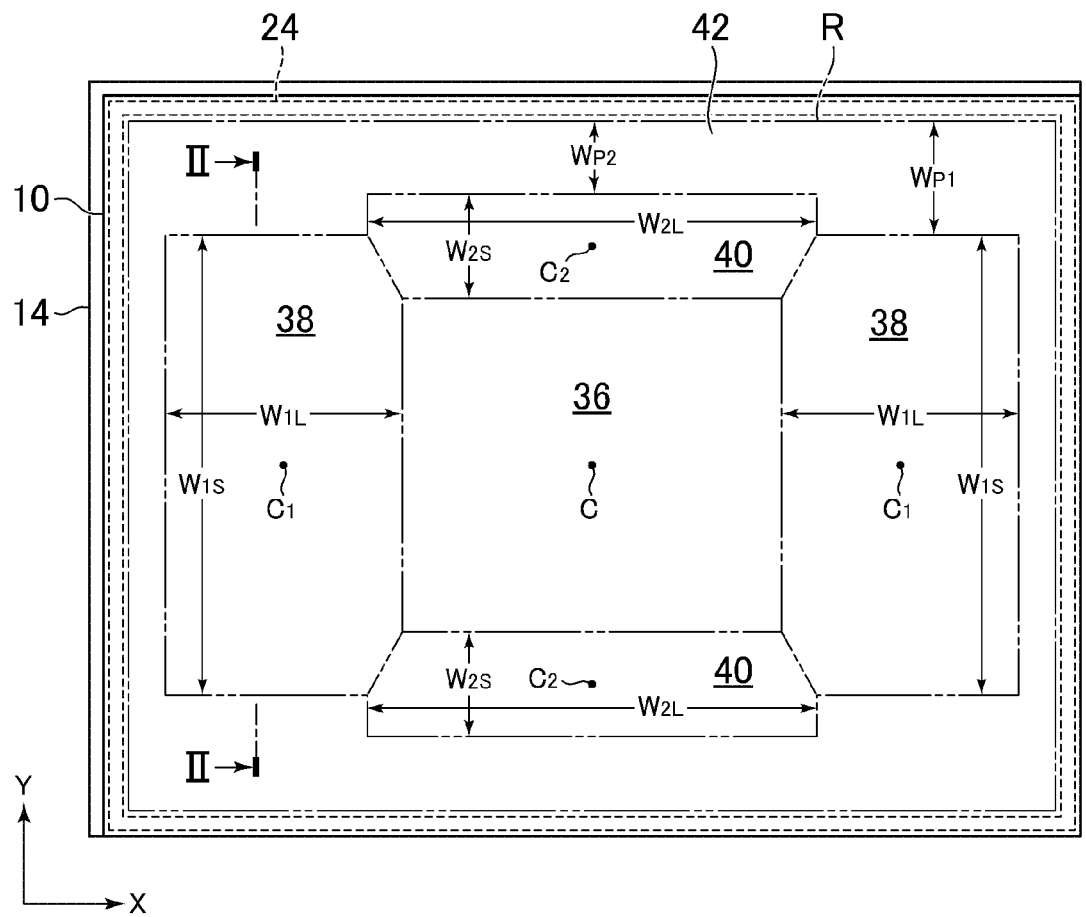
FIG. 1 is a top plan view of a liquid crystal display device according to a first embodiment of the invention.
Figure 2:
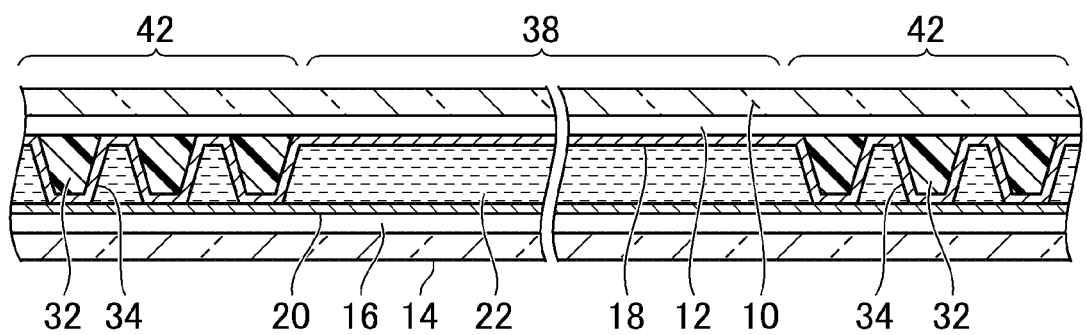
FIG. 2 is a cross-sectional view taken along line II-II of the liquid crystal display device shown in FIG. 1.

FIG. 1 is a top plan view of a liquid crystal display device according to a first embodiment of the invention. FIG. 2 is a cross-sectional view taken along the II-II line of the liquid crystal display device shown in FIG. 1.

The liquid crystal display device has a first substrate 10. The first substrate 10 is a base substrate of a color filter substrate, and as shown in FIG. 2, a coloration layer 12 is laminated thereon. The first substrate 10 is opposed to a second substrate 14 with a space interposed therebetween. The second substrate 14 is a base substrate of a thin film transistor substrate, and as shown in FIG. 2, a circuit layer 16 is laminated thereon, and a semiconductor layer, wiring, electrodes, an insulation layer, and the like are laminated on the circuit layer 16. Both the first substrate 10 and the second substrate 14 are optically transparent substrates such as glass substrates.

A first alignment film 18 is formed on the first substrate 10, and a second alignment film 20 is formed on the second substrate 14. A liquid crystal layer 22 is sandwiched between the first alignment film 18 and the second alignment film 20. The liquid crystal layer 22 is enclosed and sealed by a sealant 24 shown in FIG. 1. The sealant 24 fixes the first substrate 10 and the second substrate 14. Specifically, the sealant 24 fixes the peripheral portions of the first substrate 10 and the second substrate 14. Accordingly, when the first substrate 10 and the second substrate 14 are bent, since each peripheral portion is fixed by the sealant 24, no deviation occurs.

Figure 3:
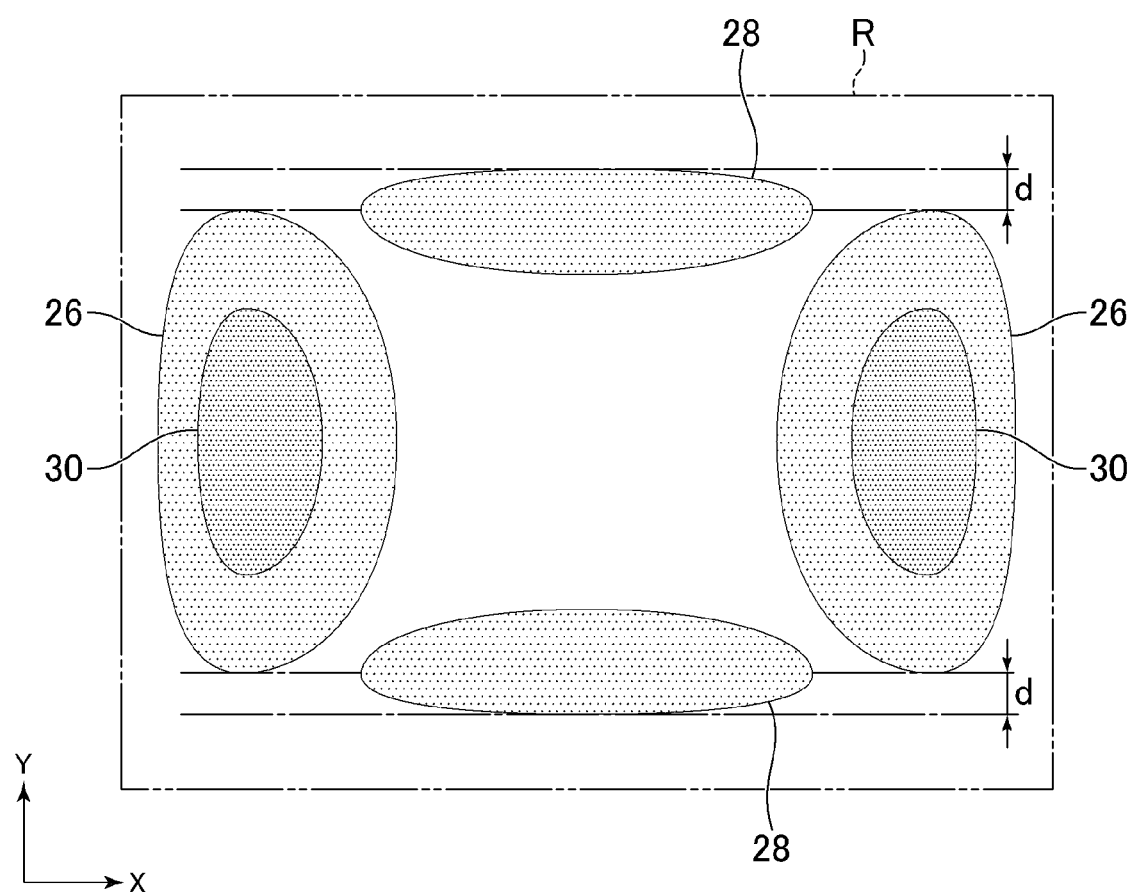
FIG. 3 is a diagram illustrating a simulation result of a heat shock test.

The inventors of the invention performed simulation of a heat shock test on the panel in which the liquid crystal layer 22 is sandwiched between the first substrate 10 and the second substrate 14 and sealed by the sealant 24. FIG. 3 is a diagram illustrating a simulation result of a heat shock test.

As shown in FIG. 3, it was discovered that a plurality of regions, in which the amount of deviation between the first substrate 10 and the second substrate 14 is large, are inside a rectangle R enclosed by the sealant 24. Specifically, regions in which the amount of deviation is large, include: right and left regions 26 in which the center is interposed between the right side and the left side thereof in the major-axis direction (X direction) of the rectangle R; and up and down regions 28 between which the center is interposed between the upper side and the lower side thereof in the minor-axis direction (Y direction) of the rectangle R. Inside each of the right and left regions 26, there is a region 30 in which the amount of deviation is larger.

As shown in FIG. 2, the spacers 32 are provided between the first substrate 10 and the second substrate 14 so as to thereby maintain a gap. The spacers 32 can be formed of resin, for example. The spacers 32 are formed in at least one of the gap between the first substrate 10 and the first alignment film 18 and the gap between the second substrate 14 and the second alignment film 20. In the example of FIG. 2, the spacers 32 are disposed only between the first substrate 10 and the first alignment film 18, and convex portions 34 are formed on the first alignment film 18 along the shapes of the spacers 32. The convex portions 34 of the first alignment film 18 are in contact with the second alignment film 20.

In the embodiment, the spacers 32 are not disposed in the regions in which it is detected by the simulation that the amount of deviation between the first substrate 10 and the second substrate 14 is large. Hereinafter, the regions in which the spacers 32 are disposed, and the regions in which the spacers 32 are not disposed, will be described.

As shown in FIG. 1, the region of the first substrate 10 and the second substrate 14 enclosed by the sealant 24 is a rectangle R. The rectangle R includes a central region 36. The rectangle R includes a pair of first regions 38 between which the central region 36 is interposed in the major-axis direction (X direction) of the rectangle R. The rectangle R includes a pair of second regions 40 between which the central region 36 is interposed in a minor-axis direction (Y direction) of the rectangle R. The pair of first regions 38 and the pair of second regions 40 are regions successively surrounding the central region 36. The rectangle R includes a peripheral region 42 that surrounds the central region 36, the pair of first regions 38, and the pair of second regions 40.

The width $W_{1L}$ of the first region 38 in the major-axis direction (X direction) is a quarter of the length of the major axis. The width $W_{1S}$ of the first region 38 in the minor-axis direction is two thirds of a length of the minor axis. The central point $C_1$ of the first region 38 in the major-axis direction is at a position separated from the central point C of the rectangle R by one third of the length of the major axis in the major-axis direction. The width $W_{2L}$ of the second region 40 in the major-axis direction is half of the length of the major axis. The width $W_{2S}$ of the second region 40 in the minor-axis direction is one eighth of the length of the minor axis. The central point $C_2$ of the second region 40 in the minor-axis direction is at a position separated from the central point C of the rectangle R by one third of the length of the minor axis in the minor-axis direction.

The spacers 32 are disposed in the central region 36 and the peripheral region 42 except the pair of first regions 38 and the pair of second regions 40. Thereby, since the spacers 32 are not disposed in the regions (refer to FIG. 3) in which the amount of deviation between the first substrate 10 and the second substrate 14 is large, it is possible to reduce the rate of occurrence of the microscopic bright spots due to exfoliation of the first alignment film 18 and the second alignment film 20.

Further, as shown in FIG. 3, it would appear that the up and down regions 28, in which the amount of deviation is large, are deviated by a distance d in the minor-axis direction (Y direction) from the right and left regions 26 in which the amount of deviation is large similarly. Conversely, the upper and lower areas of the right and left regions 26 are larger than the upper and lower areas of the up and down regions 28.

Accordingly, as shown in FIG. 1, in the peripheral region 42, the width $W_{P1}$ from each of the first regions 38 to one long side of the rectangle R in an outward direction is larger than the width $W_{P2}$ from one of the second regions 40 to the one long side in the outward direction.

In such a manner, in the peripheral region 42 in which the spacers 32 are disposed, the region adjacent to each first region 38 is larger than the region adjacent to each second region 40. Hence, by securing a large area for arrangement of the spacers 32, it is possible to reduce a variation in gap.

[Second Embodiment]

Figure 4:
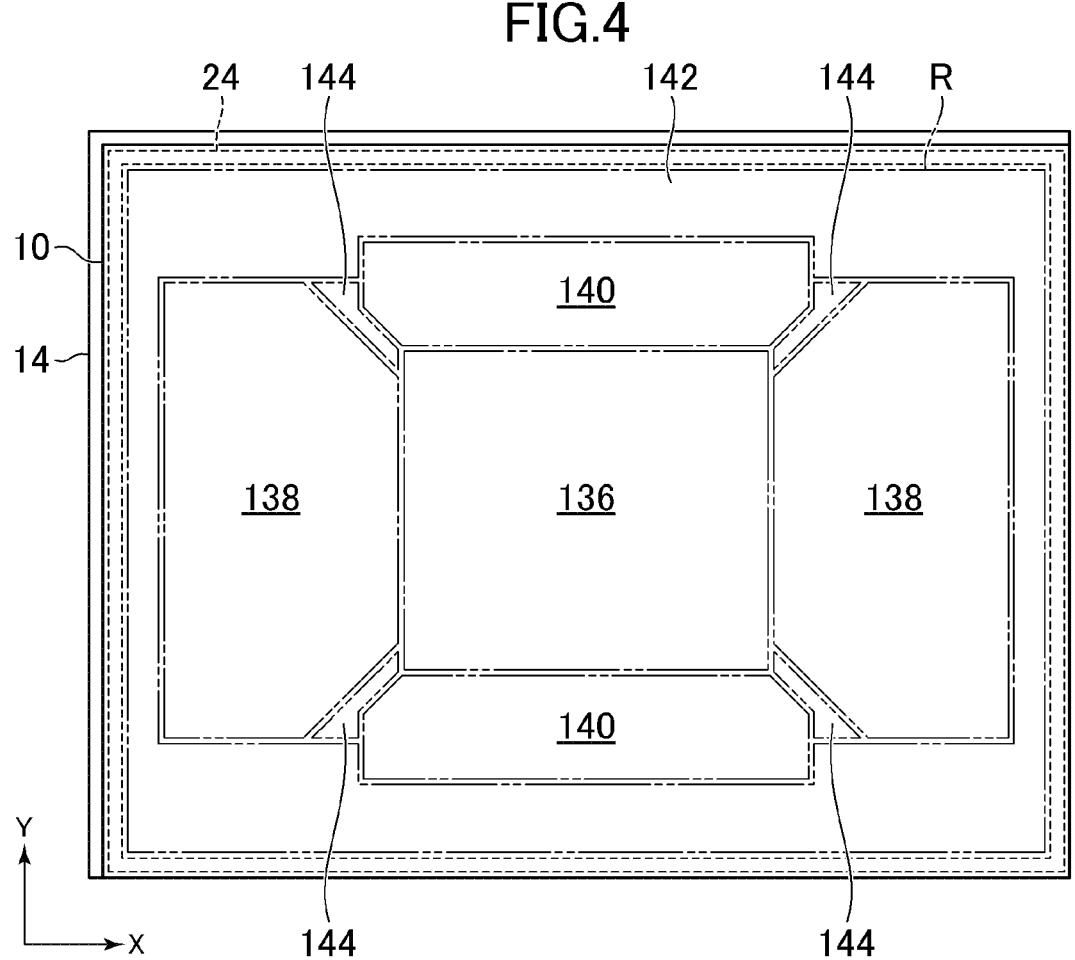
FIG. 4 is a top plan view of a liquid crystal display device according to a second embodiment of the invention.

FIG. 4 is a top plan view of a liquid crystal display device according to a second embodiment of the invention. In the embodiment, a third region 144, in which the spacers 32 (refer to FIG. 2) are disposed, is interposed between one first region 138 and one second region 140 adjacent to each other. Accordingly, the first regions 138 and the second regions 140 are not successive. In other words, the third regions 144, in which the spacers 32 are disposed, are provided such that the peripheral region 142 and the central region 136, in which the spacers 32 are disposed, are connected to each other. With such a configuration, it is possible to further increase the number of spacers 32 compared with the first embodiment, and thus it is possible to further reduce a variation in gap.

[Third Embodiment]

Figure 5:
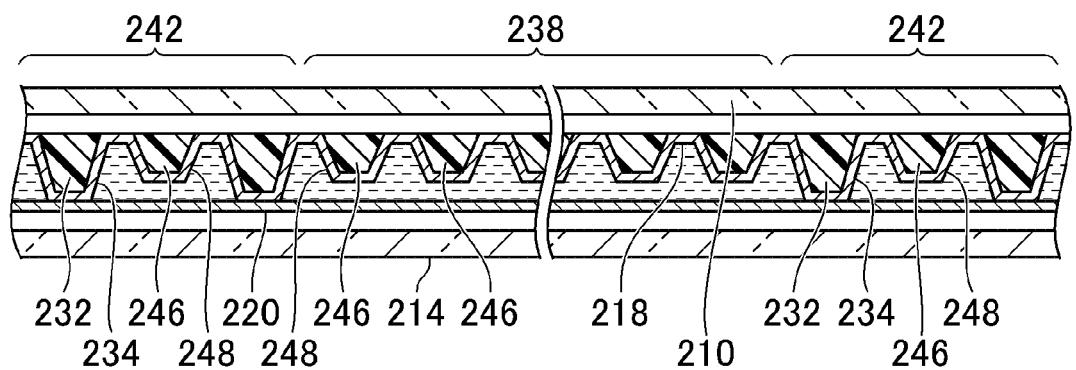
FIG. 5 is a partial cross-sectional view of a liquid crystal display device according to a third embodiment of the invention.

FIG. 5 is a partial cross-sectional view of a liquid crystal display device according to a third embodiment of the invention.

In the embodiment, stoppers 246 are provided in addition to the spacers 232. The stopper 246 has a height (a length in a protrusion direction) less than that of the spacer 232, and thus it may have a structure which is the same as that of the spacers 232 except for the difference in height. The stoppers 246 may be formed of resin.

The stoppers 246 are formed in at least one of the gap between the first substrate 210 and the first alignment film 218 and the gap between the second substrate 214 and the second alignment film 220. The stoppers 246 may be provided on only one (for example, the first substrate 210 or the second substrate 214 on which spacers 232 are provided) of the first substrate 210 and the second substrate 214. In the example of FIG. 5, the stoppers 246 are disposed only between the first substrate 210 and the first alignment film 218, and second convex portions 248 are formed on the first alignment film 218 along the shapes of the stoppers 246.

The stoppers 246 are disposed in the pair of first regions 238 and the pair of second regions 40 (refer to FIG. 1) in which the spacers 232 are not disposed. Further, the spacers 232 and the stoppers 246 may be mixed in the central region 36 (refer to FIG. 1) and the peripheral region 242. Alternatively, the spacers 232 and the stoppers 246 may be mixed in the third regions 144 described in the second embodiment.

The convex portions 234 of the first alignment film 218 formed by the spacers 232 form a gap between the first alignment film 218 and the second alignment film 220. Therefore, the second convex portions 248 of the first alignment film 218 formed by the stoppers 246 do not come into contact with the second alignment film 220. However, when the gap between the first alignment film 218 and the second alignment film 220 is narrowed by external force, by providing the second convex portions 248 formed by the stoppers 246, it is possible to prevent the gap from being narrowed excessively.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
a first substrate;
a second substrate that is disposed to be opposed to the first substrate with a space interposed therebetween;
a first alignment film that is formed on the first substrate;
a second alignment film that is formed on the second substrate;
spacers that are formed in at least one of a gap between the first substrate and the first alignment film and a gap between the second substrate and the second alignment film so as to thereby maintain a gap between the first substrate and the second substrate;
a liquid crystal layer that is sandwiched between the first alignment film and the second alignment film; and
a sealant that encloses and seals the liquid crystal layer and fixes the first substrate and the second substrate,
wherein a region of the first substrate and the second substrate enclosed by the sealant is a rectangle,
wherein the rectangle includes a central region, a pair of first regions between which the central region is interposed in a major-axis direction of the rectangle, a pair of second regions between which the central region is interposed in a minor-axis direction of the rectangle, and a peripheral region that surrounds the central region, the pair of first regions, and the pair of second regions,
wherein the spacers are disposed in the central region and the peripheral region except the pair of first regions and the pair of second regions, and
wherein in the peripheral region, a width from each of the first regions to one long side of the rectangle in an outward direction is larger than a width from one of the second regions to the one long side in the outward direction.

2. The liquid crystal display device according to claim 1, wherein the pair of first regions and the pair of second regions are regions successively surrounding the central region.

3. The liquid crystal display device according to claim 1, wherein a region, in which the spacers are disposed, is interposed between one of the first regions and one of the second regions adjacent to each other.

4. The liquid crystal display device according to claim 1, further comprising stoppers that are formed in at least one of the gap between the first substrate and the first alignment film and the gap between the second substrate and the second alignment film and have a height less than that of the spacers,
wherein the stoppers are disposed in the pair of first regions and the pair of second regions.

5. The liquid crystal display device according to claim 4, wherein the spacers and the stoppers are mixed in the central region and the peripheral region.

6. The liquid crystal display device according to claim 4, wherein the spacers are provided on only one of the first substrate and the second substrate, and wherein the stoppers are provided on only the first substrate or the second substrate on which the spacers are provided.

7. The liquid crystal display device according to claim 1, wherein the first substrate is a color filter substrate, wherein the second substrate is a thin film transistor substrate, and wherein the spacers are provided on only the first substrate.

8. The liquid crystal display device according to claim 1, wherein the width of each of the first regions in the major-axis direction is a quarter of a length of the major axis.

9. The liquid crystal display device according to claim 1, wherein the width of each of the first regions in the minor-axis direction is two thirds of a length of the minor axis.

10. The liquid crystal display device according to claim 1, wherein a central point of each of the first regions in the major-axis direction is at a position separated from a central point of the rectangle by one third of a length of the major axis in the major-axis direction.

11. The liquid crystal display device according to claim 1, wherein the width of each of the second regions in the major-axis direction is half of a length of the major axis.

12. The liquid crystal display device according to claim 1, wherein the width of each of the second regions in the minor-axis direction is one eighth of a length of the minor axis.

13. The liquid crystal display device according to claim 1, wherein a central point of each of the second regions in the minor-axis direction is at a position separated from a central point of the rectangle by one third of a length of the minor axis in the minor-axis direction.

* * * * *